Patented Apr. 21, 1942

2,280,085

UNITED STATES PATENT OFFICE 2,280,085

SUGAR FROM SORGHUM JUICES

Emil K. Ventre, Baton Rouge, La., and Howard S. Paine, Chevy Chase, Md., assignors to Claude R. Wickard, as Secretary of Agriculture of the United States of America, and to his successors in office No Drawing. Application March 24, 1941, Serial No. 384,962

2 Claims. (Cl. 127—46)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

Our invention relates to a process for the manufacture of sucrose from juices of the sorgo plant (saccharine sorghum), which includes the removal as byproducts of such interfering substances as starch and salts of the plant acids.

Failure of early attempts to secure efficient crystallization of sucrose consistently from juices of the sorgo plant was ascribed by other investigators of this process to materials called "gums." Subsequent investigations by us have established the fact that these "gums" were principally starch, which upon gelatinization and concentration, has the property of making the sirups highly gelatinous, or viscous, so that proper concentration and heat circulation cannot be obtained in the vacuum pan for the degree of supersaturation required for adequate growth of the sugar crystals. We have also found that, in many instances, sorgo juices originally possessing a high acid content were highly viscous when clarified on the acid side, whereas when clarified on the alkaline side these juices yielded crystallized non-sugar materials which interfered with efficient recovery of sucrose. Analysis of this precipitated non-sugar material showed that it consists largely of alkaline earth salts of aconitic and other acids. Material of this sort makes it difficult or impossible to boil strikes of sugar, even in the case of starch-free sirups, since upon concentration of the sirup in the vacuum pan the interfering salts precipitate or crystallize at a concentration less than the degree of supersaturation required for sucrose crystallization. Then on-sugar crystals grow until they reach "smear" size and then stop growing. When sucrose crystals are subsequently formed, it is practically impossible to build up a strike of sugar because the interfering "smear" remains in the pan to confuse the operator. Moreover, in case a strike of sugar is boiled regardless of this difficulty, the "smear" of non-sugar substances prevents efficient spinning of the massecuite in the centrifuge. The removal of both starch and interfering non-sugar salts has been found to be necessary for efficient production of sorgo sugar.

By investigation of various possible methods for starch removal, we have found that by centrifuging the cold sorgo juice in a solid wall basket an average of about 70 per cent of the starch originally present may be separated from the juice. Depending upon the variety of sorgo, this amounts to one-third of a pound to about ten pounds of starch per ton of cane. This starch is a byproduct of value. A method of tabling the juice removed roughly only half as much starch, and possesses the further disadvantages of requiring more factory space than do centrifugals and leading to loss of juice. A method of defecation, by which the cold juice was limed to 8.4 to 8.6 pH and heated to the boiling point in an open defecator, was effective in removing about 70 percent of the starch, most of which was brought to the top of the defecator in the "blanket" of scums. It was determined that as much as 92.5 percent of the starch could be removed physically by a combination of the centrifuging and defecating procedures, leaving a relatively small proportion to be subsequently removed by enzymatic treatment. Practically complete removal of the remaining starch by a starch converting enzyme was found necessary to secure "free working" of the juices and maximum sucrose recovery.

The problem of precipitating the salts of the organic and inorganic acids at such a stage in the process as to make possible their efficient removal from the sirup was solved by heating the evaporator sirup at a density of about 32° Baumé to the temperature of boiling and allowing it to settle for 6 to 10 hours. It was found that so little remained it caused no particular trouble in working the first and second molasses. This non-sugar material was determined to consist largely of calcium aconitate in admixture with some magnesium aconitate, and is another valuable byproduct of the process. The average percentage of ash removal accomplished by heating and settling the sirups from six sorgo varieties amounted to a nearly constant figure of 0.72 percent ash based on the weight of total sirup solids. Calculations based on these figures showed an average ash removal of 1.545 pounds per ton of cane handled. This is equivalent to about 3.5 pounds of calcium aconitate.

The yield of sugar obtained by our evaluations indicated that certain varieties of sorgo may contain as much recoverable sucrose per ton as does the average Louisiana sugarcane. Although varieties differ considerably in sucrose content and crop tonnage per acre, our process, herein described for manufacturing the sugar, has been found to give consistently good results.

Our equipment has included a crystallizer, by the use of which second and third sugars have been made.

The following is an illustrative example of the manner in which the principles of our present invention may be put into practice:

Raw cold sorgo juice, which may be obtained by either the ordinary milling process, or by low-temperature diffusion, is centrifuged by the semi-continuous process, preferably in a solid basket type centrifuge. This amounts to a reduction in starch content of about 70 percent. The separated starch, which is a valuable byproduct, may be purified by usual starch-making procedures.

The centrifuged raw cold juice is then limed in the cold to a pH of 8.4 to 8.6, heated to the boiling point in open defecators, and allowed to settle. The muds and scums are filterpressed, and the press juice is combined with the decanted clarified juice. The defecation step in the process removes about 20 to 22 percent of the starch originally present in the juice prior to centrifuging.

The clarified juice, which should have a pH of 6.8 to 7.2, is next cooled to 65° C. by "flashing," and is then treated with a starch-converting enzyme to remove the remaining starch. Although other enzyme preparations may be used, it has been found that 10 grams of pancreatic amylase per 50 gallons of juice is sufficient for the practically complete removal of starch required in order to obtain maximum sucrose recovery. The enzyme is permitted to act on the juice while the juice is being evaporated to about 32°-Baumé sirup in a vacuum evaporator at a temperature below 70° C.

The 32°-Baumé sirup is heated to the boiling temperature and settled 6–10 hours. At this stage of the process it has been found that in the case of 6 sorgo varieties an average of 0.72 percent of ash, based on total sirup solids, can be removed by ordinary sedimentation. This amounts to about 1.55 pounds of ash removal per ton of sorgo cane. As this material has been found by analysis to consist largely of lime salts of organic acids, principally aconitic acid, the ash recovered has been calculated to be equivalent to about 3.5 pounds of calcium aconitate, or 2.3 pounds of aconitic acid, per ton of cane. This is a second byproduct in the process of considerable value.

Crystallization of sugar from the clarified sirup is accomplished by methods common to the art in beet or cane sugar manufacturing practice.

Yields of raw and refined sugar per ton of good quality sorgo cane have been obtained equivalent to yields from Louisiana sugarcane of similar quality.

Modifications of this process will suggest themselves to those familiar with the art, and some discretion as to the details of the manner of carrying out our invention must of necessity be left to the operator.

Having thus described our invention, what we claim for Letters Patent is:

1. A process for the manufacture of sucrose and byproducts from the juices of saccharine sorghum, which comprises subjecting the cold raw juices of saccharine sorghum to the action of centrifugal force, whereby substantially 70 percent of the starch originally present is removed, thence adding an alkaline earth clarifying agent in an amount sufficient to yield a clarified juice having a pH ranging from 6.8 to 7.2 after clarification, and thence heating the juice at a temperature ranging from 100° C. to 107° C., thence cooling in vacuo the clarified juice to a temperature not exceeding 70° C., thence adding a starch converting enzyme, whereby during the evaporation of the juices to the density of a 32°-Baumé sirup the residual starch is substantially converted to sugars, thence subjecting the 32°-Baumé sirup to a temperature of boiling and thence settling and filtering, whereby the alkaline earth salts are precipitate and recovered as byproducts, the while recovering the sucrose.

2. A process for the manufacture of sucrose and byproducts from the juices of saccharine sorghum, which comprises subjecting the cold raw juices of saccharine sorghum to the action of centrifugal force, whereby substantially 70 percent of the starch originally present is removed, thence adding lime in an amount sufficient to yield a clarified juice having a pH ranging from 6.8 to 7.2 after clarification, and thence heating the juice at a temperature ranging from 100° C. to 107° C., thence cooling in vacuo the clarified juice to a temperature not exceeding 70° C., thence adding a starch converting enzyme, whereby during the evaporation of the juices to the density of a 32°-Baumé sirup the residual starch is substantially converted to sugars, thence subjecting the 32°-Baumé sirup to a temperature of boiling, and thence settling and filtering, whereby the alkaline earth salts are precipitated and recovered as byproducts, the while recovering the sucrose.

EMIL K. VENTRE.
HOWARD S. PAINE.